United States Patent Office 3,346,367
Patented Oct. 10, 1967

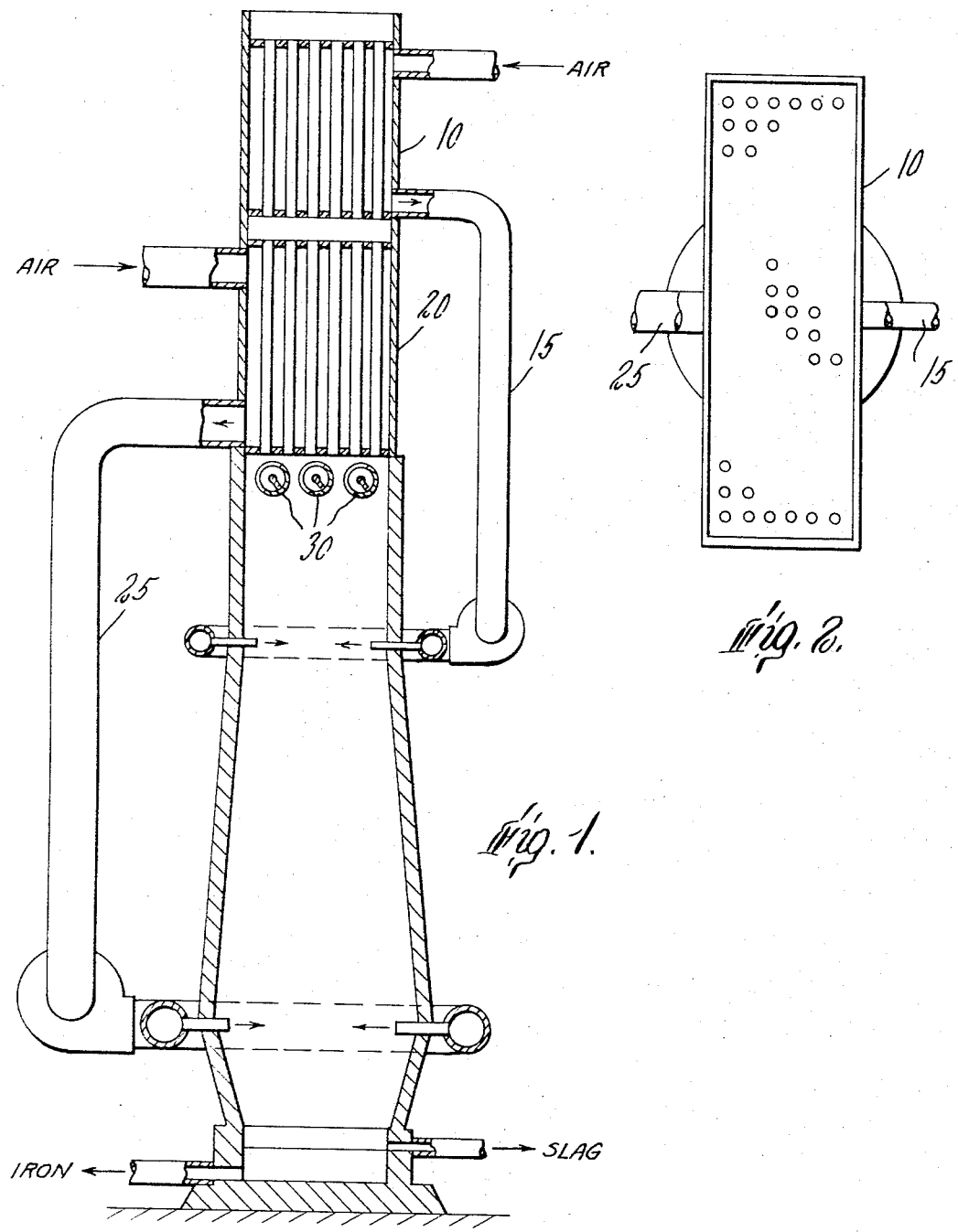

3,346,367
SHROUDED FUEL BLAST FURNACE
OPERATION
Ervin G. Bailey, Bethlehem Township, Pa., assignor to
Bailey Inventions, Inc., Bethlehem Township, Pa., a corporation of Pennsylvania
Filed May 26, 1964, Ser. No. 370,278
2 Claims. (Cl. 75—42)

This invention relates to blast furnaces for the manufacture of iron and more particularly to improving their thermal efficiency.

A primary object of the invention is to decrease the B.t.u./cu. ft., actual or potential, of the top gas emanating from such furnaces by decreasing its combustible content through burning more of these combustible constituents (CO and $H_2$) within the furnace and applying the additional heat energy thereby released to pre-heating the incoming charge.

In conventional present day blast furnace operation, utilizing coke, it is well known that the escaping top gas contains a large proportion of combustible gases in the form of CO and $H_2$. The top gas has such a high calorific value that it is essential as a matter of economics that it should undergo secondary combustion to recover the values, either by pre-heating air, or by generating steam, or by other means.

For example, a typical operation described in Blast Furnace and Steel Plant for December 1961, p. 1192, gave as a top-gas analysis a $$\frac{CO}{CO+CO_2}$$

ratio by volume of 27.6/40.8 or more than 67% CO. Recovery of the energy in this gas requires much expense for handling, cleaning and burning in expensive stoves and supplemental equipment.

Burning carbon incompletely in the blast furnace by reaction with $O_2$, $H_2O$ and the oxides of iron only partially produces only about one-third of the heat produced by complete combustion to $CO_2$. Hence, the deficiency in heat resulting from burning the carbon in the charge only partially instead of completely has to be made up from other sources in order to create temperature conditions which promote properly the iron reduction reactions.

For these sources, the industry has resorted to using either more coke or increased air blast temperature, or both. Coke use is, however, of prime concern to the industry because of its cost, as demonstrated by the current attempts to supply some portion of the needed heat energy from supplemental cheaper fuels, such as gas, oil and pulverized coal, by injection into the bosh. Higher air blast temperatures, approaching 2000° F., become increasingly uneconomical.

Burning within the furnace more of the CO and $H_2$ gases generated in the furnace, rather than permitting such combustible gases to escape from the furnace with the top gases, and applying the heat thus produced to pre-heat the charge, would not only lessen the quantity of coke or other fuel required, but also hold the primary air blast temperature to an economical level.

But, burning more of the combustible gases within the furnace below the fuel intake does not at first seem feasible because the combustible gases would have to be burned at an upper level of the furnace where they were no longer needed to provide the high $$\frac{CO}{CO+CO_2}$$

proportion to promote reduction of the iron. Since this upper zone normally contains no oxygen, burning of the combustible gases at this level would necessitate the introduction of secondary air or enriched air at the upper level. Any such introduction of oxygen below the feed intake would be disastrous because such additional combustion-sustaining gas would consume the incoming carbon in the fuel as well as, and more likely in preference to, the CO or $H_2$, thus defeating both my objectives. The bosh would be starved of carbon, and either increased amounts of fuel would have to be used, or a higher air blast temperature, or both.

The remedy which I provide is founded on the observation that the assumption that the CO and other combustible gas at the upper level could not be burned there without consuming the incoming coke was not necessarily correct; and that such burning of the coke at this upper level could be prevented by shrouding the fuel against contact and hence reaction with any secondary air which is introduced at an upper level, above the reducing zone, to react with the combustible gases, the shroud being of such a kind and nature as to protect the fuel by virtue of a high melting point until the fuel has descended into the hotter level of the furnace whereat the shrouding material will be removed to initiate gasification of the carbon in the coke only after it has descended to a level where it encounters oxygen introduced by the air blast injected into the bosh.

In accordance with this invention, a solid meltable material is hence interposed between the secondary air introduced at the upper level to burn the combustible gases there present and the surfaces of the fuel being added at the top of the furnace.

This is done preferably by encasing, enshrouding, or otherwise sealing the surfaces of each individual piece in the fuel charge with a shroud in the form of a solid meltable material, sealing the surfaces of the fuel from direct exposure to air. The shrouding material should be chemically inert to carbon, oxygen, CO, and $H_2$ at temperatures up to about 2200° F., and have a melting or solubility point in excess of 2200° F.

Results within the contemplation of this invention may be attained by using, for the shrouding material, readily available meltable materials, for example, a reliable shrouding material can be provided by merely sealing the solid fuel in a multiplicity of rigid metal containers of steel, iron (tin cans), or other meltable gas-impervious material which alloys with iron from the ore. In all cases, the shrouding material should have a melting point in excess of 2200° F.—the higher the better, consistent with raw material and handling costs up to about 3000° F.

In operation, then, with a blast furnace coke as an example, the surfaces of the coke will not be exposed at the high level either to hot $CO_2$ or $H_2O$ gases ascending in the furnace or to secondary air introduced at the high level and will remain unexposed until the shrouded fuel has descended into that part of the furnace where the temperature exceeds the melting point of the container metal, and the shroud is melted, then first exposing the carbon for reaction with the air blast to form very hot CO and $H_2$.

Air or oxygen-enriched air is then injected into the upper zone of the furnace in quantities to develop additional heat from the combustion of CO and $H_2$ there present. Whatever heat is released here acts to pre-heat the incoming charge, diminishing by an approximately corresponding amount the heat supplied from the bosh, which, in current operations, supplies all the heat needed to heat the downflowing charge. This diminished demand from the bosh in turn permits a decrease in the fuel supplied to the bosh, or a decrease in the air blast temperature, or both.

If desired, the furnace may be heightened to provide a zone of adequate height for this burning and pre-heating to occur.

A secondary advantage is that the shrouding of the fuel during its passage through this upper zone eliminates the usually present reactions between the fuel and ascending hot $CO_2$ and $H_2O$ gases. Such reactions release CO and $H_2$. When released in the upper zone at a level where the temperature and pressure conditions are insufficient to utilize them for reducing purposes and combustion-sustaining gas is not present, they escape as part of the unburned combustibles without contributing their heat energy to the furnace.

It is further contemplated that the top gases, now substantially reduced in combustible gas content, may be passed in heat exchange relation with, first, the incoming air blast line and then the secondary air line to aid in pre-heating these gases, and extract further heat from the top gases after they have served to pre-heat the incoming charge.

This latter operation is illustrated in the accompanying drawing, in which FIG. 1 is a blast furnace partly in section and FIG. 2 is a top plan view of the furnace. The blast furnace is surmounted by two tubular air heaters, the upper of which 10 is utilized to pre-heat secondary air which flows through a connecting line 15, down into the furnace at an upper level. Beneath the top tubular heater is a second tubular heater 20 which is utilized to pre-heat air which flows through a connecting line 25 down and into the bosh.

The charge, including the shrouded fuel, is fed into the furnace by screw feeder 30.

Calculations show that with this arrangement a bosh temperature of 3500° F. can be developed with a blast temperature of 1200° F. and a secondary air input temperature of 800° F. which provides an increment of heat sufficient to pass the top gas into the lower tubular heater at 1600° F. and into the upper tubular heater at 1000° F. with an escape temperature of 400° F. These figures are approximate and illustrative only and are subject to variation according to the particular nature of the fuel and charge.

The important feature is that no substantial drop in the temperature of the ascending gases occurs between the secondary air intake and the charge intake, despite the relatively low temperature of the incoming charge. The consequence is that the temperature differential at the charge intake is much greater than in normal operation, with the result that all the temperatures down through the furnace are maintained at properly high levels, despite moderate air blast temperature and economical fuel usage.

What is claimed is:

1. The method of improving the thermal efficiency of blast furnace operation, wherein solid carbonaceous fuel is added along with ore onto the top of a vertically descending reaction bed in counterflow relation to flow of gaseous constituents ascending through said bed as the result of blasting air into the bosh, comprising decreasing the calorific value of the gas escaping at the top of said bed due to the presence of combustible $H_2$ and CO constituents therein above the ore-reducing zone of the furnace by feeding the carbonaceous fuel onto the top of said bed encased within a multiplicity of individual gas-impervious rigid ore-free containers constituted of metal having a melting point in excess of 2200° F. and selected from the class of metals which consists of steel, iron and metals which alloy with iron, to shroud said fuel and prevent ascending $CO_2$ and $H_2O$ gases and any ore from making contact with said fuel as it descends through an upper zone of said bed wherein the temperature is held below ore-reducing temperature and, after said fuel-containing containers have descended below said upper zone, melting said containers to expose the within-contained fuel to the air blasted into said bosh to produce in a zone below said upper zone sufficient CO and heat from said carbonaceous fuel as the primary source of heat and CO for raising the temperature in said lower zone to ore-reducing temperature and reducing the ore as it descends through said lower zone of said bed, substantially none of said carbonaceous fuel being consumed until it reaches said lower zone.

2. The method as claimed in claim 1, which includes injecting secondary air into said upper zone to burn combustible CO and $H_2$ gases ascending into said upper zone at a level whereat the fuel-containing containers will prevent contact of said injected air with the carbon of said fuel, to develop heat, additional to heat generated below said upper zone, for pre-heating the incoming ore.

References Cited

UNITED STATES PATENTS

| 393,553 | 11/1888 | Graff | 75—42 |
| 406,210 | 7/1889 | Graff | 75—42 |
| 869,043 | 10/1907 | Arden | 75—42 |
| 1,148,782 | 8/1915 | Kilbourn | 75—42 X |
| 2,767,080 | 10/1956 | Wiberg | 75—42 X |
| 2,799,576 | 7/1957 | Gumz et al. | 75—42 X |
| 2,805,146 | 9/1957 | Howard. | |

FOREIGN PATENTS

| 884,598 | 12/1961 | Great Britain. |

DAVID L. RECK, *Primary Examiner.*

HYLAND BIZOT, *Examiner.*

H. W. TARRING, *Assistant Examiner.*